(No Model.)
G. SCHENCK.
MECHANICAL MOVEMENT.
No. 380,697. Patented Apr. 10, 1888.
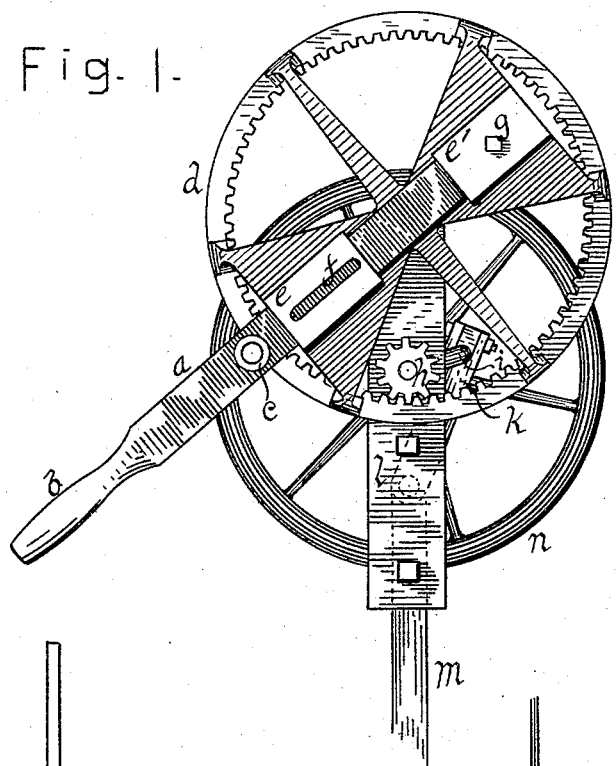
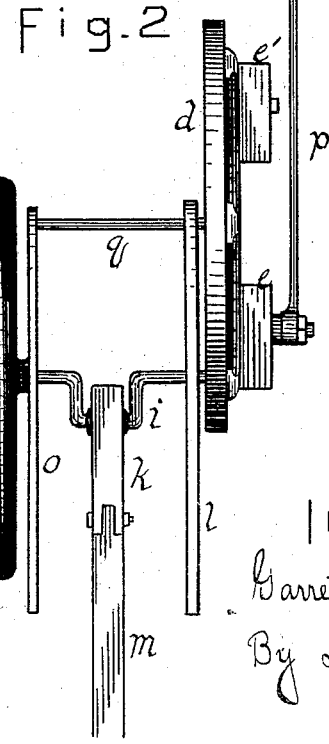
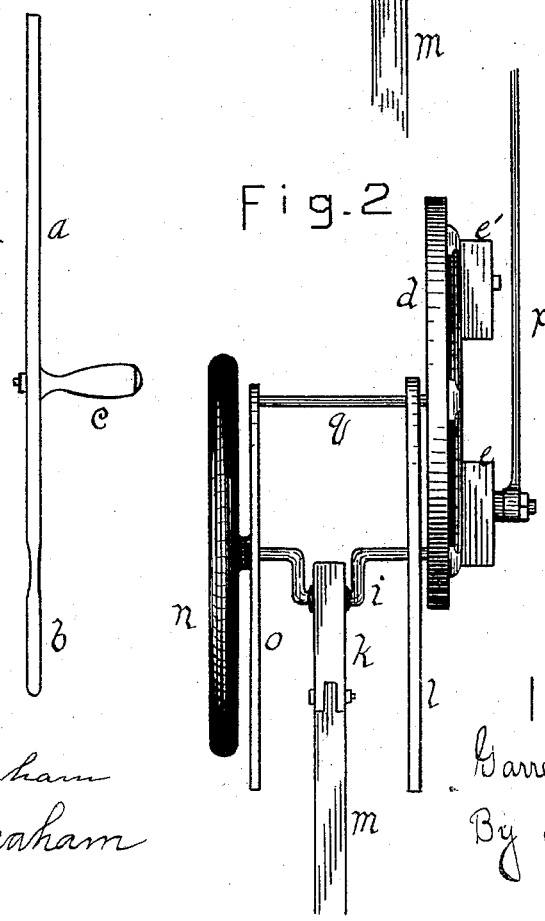
ATTEST
Helen Graham
W. W. Graham
INVENTOR
Garrett Schenck.
By L. P. Graham.
his attorney.

UNITED STATES PATENT OFFICE.

GARRETT SCHENCK, OF AUSTIN, ILLINOIS.

MECHANICAL MOVEMENT.

SPECIFICATION forming part of Letters Patent No. 380,697, dated April 10, 1888.

Application filed December 27, 1887. Serial No. 259,052. (No model.)

*To all whom it may concern:*

Be it known that I, GARRETT SCHENCK, of the township of Austin, county of Macon, and State of Illinois, have invented a certain Improved Mechanical Movement, of which the following is a specification.

In the drawings accompanying and forming a part of this specification, Figure 1 is a side elevation of my device. Fig. 2 is a front elevation, and Fig. 3 represents the handle detached.

The handle-bar $a$ has its end $b$ formed into a handle, and is also provided with lateral handle $c$. The internal-gear wheel, $d$, has sockets $e\ e'$ to receive the handle-bar. Socket $e$ has a longitudinal slot, $f$, in its outer wall, and socket $e'$ has set-bolt $g$, that is made to engage and retain the handle-bar. Pinion $h$ is mounted on an end of crank-shaft $i$ and meshes with the internal gear of wheel $d$. A reciprocating bar is connected with the crank-shaft, as shown at $k\ m$, and a fly-wheel, $n$, is mounted on the end opposite the pinion. Brackets $l$ and $o$ provide bearings for the shafts of the wheel and the pinion.

The motion of the gear-wheel is imparted to bar $m$ through the pinion and the crank shaft; and said bar $m$ may be either a pump-rod, a churn-dasher, or any other device that reciprocates in a right line.

Intermittent rotary motion in reverse directions may be imparted to the gear-wheel by oscillating handle $b$. Handle $c$ enables continuous rotary motion to be imparted to the gear-wheel by hand-power.

The handle-bar $a$ may be detached from the gear-wheel and a rod of a wind-wheel be connected therewith, as shown at $p$ in Fig. 2. In this case the connecting-bolt will rest in slot $f$, which will permit radial adjustment. The wind-wheel connection will be desirable when the device is used in connection with a pump.

In churning continuous rotary motion may be alternated with oscillatory motion, which will rest the operator and increase the efficiency of the operation.

The fly-wheel is used to avoid dead-centers, and it is utilized both in the continuous rotary motion and the oscillatory motion of the gear-wheel.

It will be readily seen that in whatever way the device is used the speed imparted to the reciprocating bar will greatly exceed the speed of the gear, so that with a given speed in the actuating mechanism an unusual amount of work may be accomplished.

The position of the handle-bar may be anywhere in the circle, so that when the operator tires of one position he may adopt another, and when he tires of the oscillatory motion he may rotate the gearing by means of handle $c$.

I claim as new and desire to secure by Letters Patent—

1. In mechanical movements, in combination, the reciprocating bar, the crank-axle, the pinion, the gear-wheel, and the handle-bar $a$, removably secured to the gear-wheel and provided with handles $b$ and $c$, as and for the purpose set forth.

2. In mechanical movements, in combination, the reciprocating bar, the crank-axle, the pinion, the fly-wheel, the gear-wheel having the sockets, provided one with a longitudinal slot and the other with a set-bolt, and the handle-bar having handles $b$ and $c$, as and for the purpose set forth.

In testimony whereof I sign my name in the presence of two subscribing witnesses.

GARRETT SCHENCK.

Attest:
WILLIAM SCHENCK,
B. W. CLOUGH.